(12) United States Patent
Segal et al.

(10) Patent No.: US 12,307,876 B2
(45) Date of Patent: May 20, 2025

(54) SYSTEM, METHOD, AND APPARATUS FOR DETECTING AND ALERTING OF INMATE USAGE OF CAFETERIA

(71) Applicant: Detection Innovation Group, Inc., New Port Richey, FL (US)

(72) Inventors: David Segal, Palm Harbor, FL (US); Chris Defant, New Port Richey, FL (US); Jeremy Nelson, Spring Hill, FL (US); Fulviu Borcan, Clearwater, FL (US)

(73) Assignee: Detection Innovation Group, Inc., New Port Richey, FL (US)

( * ) Notice: Subject to any disclaimer, the term of this patent is extended or adjusted under 35 U.S.C. 154(b) by 182 days.

(21) Appl. No.: 18/357,190

(22) Filed: Jul. 24, 2023

(65) Prior Publication Data

US 2025/0037567 A1   Jan. 30, 2025

(51) Int. Cl.
*G08B 21/22* (2006.01)
*G06K 7/10* (2006.01)

(52) U.S. Cl.
CPC ......... *G08B 21/22* (2013.01); *G06K 7/10366* (2013.01)

(58) Field of Classification Search
CPC .................. G08B 21/22; G06K 7/10366
See application file for complete search history.

(56) References Cited

U.S. PATENT DOCUMENTS

| 5,218,716 A | 6/1993 | Comroe et al. |
| 5,295,180 A | 3/1994 | Vendetti et al. |
| 5,515,042 A | 5/1996 | Nelson |
| 5,959,533 A | 9/1999 | Layson et al. |
| 6,011,973 A | 1/2000 | Valentine et al. |
| 6,195,529 B1 | 2/2001 | Linz et al. |
| 6,222,458 B1 | 4/2001 | Harris |
| 6,381,533 B1 | 4/2002 | Crane et al. |
| 6,393,254 B1 | 5/2002 | Pousada Carballo et al. |
| 6,490,455 B1 | 12/2002 | Park et al. |
| 6,502,022 B1 | 12/2002 | Chastain et al. |
| 6,542,730 B1 | 4/2003 | Hosain |
| 6,556,810 B2 | 4/2003 | Suzuki |
| 6,643,517 B1 | 11/2003 | Steer |
| 6,687,497 B1 | 2/2004 | Parvulescu et al. |
| 6,687,506 B1 | 2/2004 | Girod |

(Continued)

FOREIGN PATENT DOCUMENTS

CN    202150126 U    2/2012

*Primary Examiner* — Mohamed Barakat

(74) *Attorney, Agent, or Firm* — Larson & Larson; Frank Liebenow; Justin P. Miller

(57) ABSTRACT

A system and method of determining/checking the number of times an inmate in a correctional facility traverses the food line includes the inmate wearing a body-worn device. In some embodiments, the body-worn device includes location detection so that a location of the inmate is constantly monitored and when the inmate traverses the food line more than an allotted number of times (e.g., one time), an alert is generated. In other embodiments, the body-worn device includes an identification device (e.g., an RFID or a low-power transmitter), such that the body-worn device is detectable by detection devices positioned in the food line of the correctional facility and when the inmate traverses the food line more than once (or more than an allowed number of times) an alert is generated.

17 Claims, 11 Drawing Sheets

(56) References Cited

U.S. PATENT DOCUMENTS

| | | |
|---|---|---|
| 6,701,158 B2 | 3/2004 | Moreth |
| 6,728,542 B2 | 4/2004 | Meda |
| 6,771,946 B1 | 8/2004 | Oyaski |
| 6,832,093 B1 | 12/2004 | Ranta |
| 7,027,619 B2 | 4/2006 | Pavlidis et al. |
| 7,123,874 B1 | 10/2006 | Brennan |
| 7,162,285 B2 | 1/2007 | Owens et al. |
| 7,181,229 B2 | 2/2007 | Singh et al. |
| 7,187,952 B2 | 3/2007 | Lin |
| 7,187,953 B2 | 3/2007 | Bauchot et al. |
| 7,292,848 B2 | 11/2007 | Mazzara, Jr. et al. |
| 7,653,385 B2 | 1/2010 | Arend et al. |
| 7,715,854 B2 | 5/2010 | Bogart |
| 7,876,205 B2 | 1/2011 | Catten et al. |
| 7,949,296 B2 | 5/2011 | Arend et al. |
| 8,019,354 B2 | 9/2011 | Rae et al. |
| 8,019,384 B2 | 9/2011 | Shah |
| 8,089,923 B2 | 1/2012 | Ito et al. |
| 8,131,205 B2 | 3/2012 | Rosen |
| 8,981,925 B2 | 3/2015 | Chapin et al. |
| 9,483,926 B2 | 11/2016 | Dalley, Jr. et al. |
| 10,140,820 B1* | 11/2018 | Zalewski ............... H04W 4/80 |
| 11,304,123 B1* | 4/2022 | Noonan ............... H04W 48/16 |
| 2001/0050614 A1 | 12/2001 | Yang |
| 2003/0137408 A1 | 7/2003 | Breiner |
| 2004/0077339 A1 | 4/2004 | Martens |
| 2004/0198306 A1 | 10/2004 | Singh et al. |
| 2004/0246139 A1 | 12/2004 | Harris |
| 2005/0222933 A1 | 10/2005 | Wesby |
| 2006/0099940 A1 | 5/2006 | Pfleging et al. |
| 2006/0105701 A1 | 5/2006 | Cornwell |
| 2006/0252432 A1 | 11/2006 | Gruchala et al. |
| 2006/0286930 A1 | 12/2006 | Rathus et al. |
| 2007/0026850 A1 | 2/2007 | Keohane et al. |
| 2007/0035384 A1 | 2/2007 | Belcher et al. |
| 2007/0171047 A1 | 7/2007 | Goodman et al. |
| 2007/0254632 A1 | 11/2007 | Beadle et al. |
| 2007/0281603 A1 | 12/2007 | Nath et al. |
| 2008/0043993 A1 | 2/2008 | Johnson |
| 2009/0215387 A1 | 8/2009 | Brennan et al. |
| 2011/0059688 A1 | 3/2011 | Noonan et al. |
| 2012/0242501 A1 | 9/2012 | Tran et al. |
| 2012/0309288 A1 | 12/2012 | Lu |
| 2013/0150004 A1 | 6/2013 | Rosen |
| 2013/0316638 A1 | 11/2013 | Jang et al. |
| 2014/0240088 A1* | 8/2014 | Robinette .......... G08B 21/0219<br>340/5.61 |
| 2016/0321480 A1* | 11/2016 | Hamlin ................ G16Z 99/00 |
| 2017/0026147 A1 | 1/2017 | Smith et al. |
| 2017/0220829 A1* | 8/2017 | Argentieri ............. G06Q 10/06 |
| 2018/0247094 A1* | 8/2018 | Khojastepour ......... G01S 13/75 |
| 2020/0125838 A1* | 4/2020 | Dalley, Jr. ............. H04N 23/617 |
| 2021/0201651 A1* | 7/2021 | Segal ................ H04W 52/0274 |

* cited by examiner

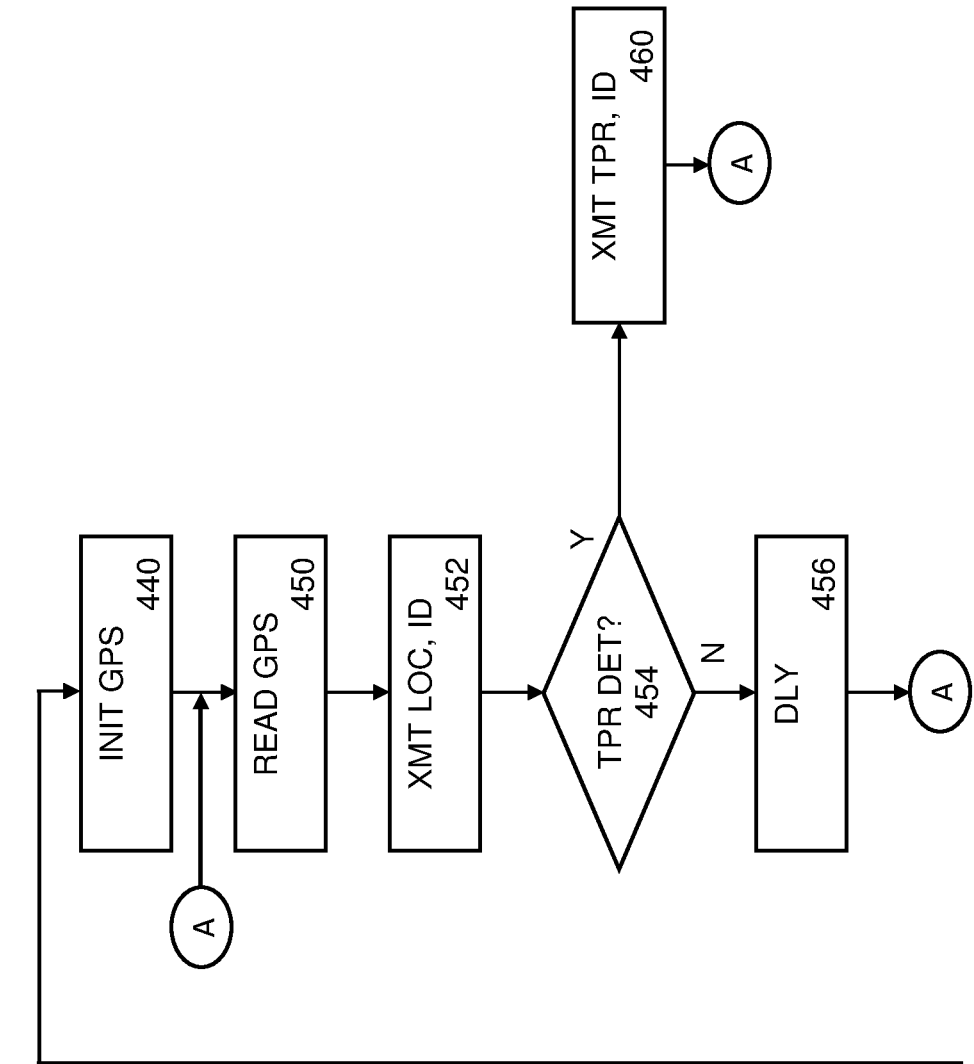
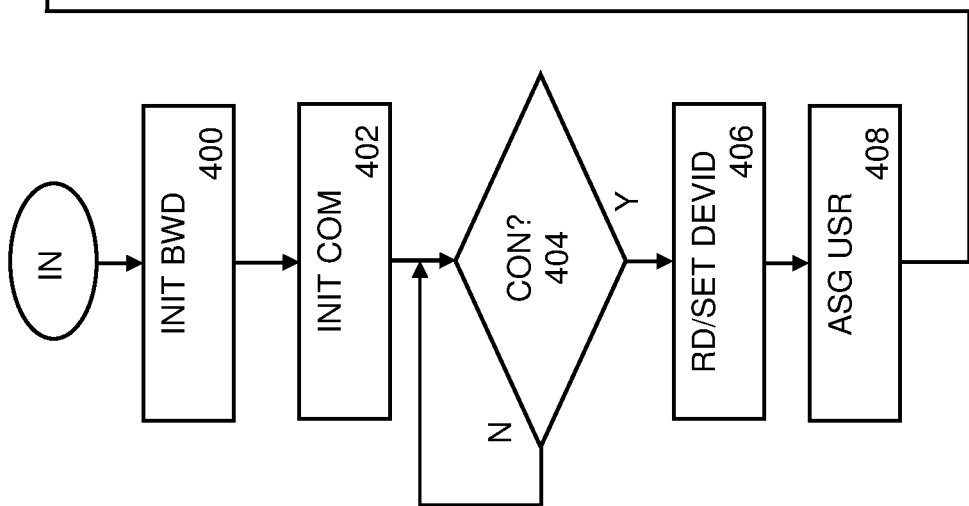
FIG. 11

SYSTEM, METHOD, AND APPARATUS FOR DETECTING AND ALERTING OF INMATE USAGE OF CAFETERIA

FIELD OF THE INVENTION

This invention relates to the field of inmate control and more particularly determining locations of inmates and alarming when not allowed.

BACKGROUND OF THE INVENTION

There are many situations when the location of an inmate needs to be determined. For example, many correctional facilities only allow an inmate to get a single meal at each mealtime, though many inmates go through the cafeteria lines more than once. This costs the correctional facility for the extra food as the correctional facility is often reimbursed for a specific number of meals for each inmate for each day. Further, by eating more than is allowed, certain inmates become obese leading to health issues that also have an associated cost for the correctional facility.

In correctional facilities, there are certain locations at which some inmates are allowed but other inmates are not allowed. For example, some inmates work in the pharmacy while some inmates are not allowed in the pharmacy for any reason.

What is needed is a system that will detect and identify an inmate when they are in the proximity of certain locations.

SUMMARY OF THE INVENTION

The basic system provides for each inmate to wear a body-worn device. In some embodiments, the body-worn device includes location detection so that a location of the inmate is constantly monitored so that when the inmate is in a location that is not permitted (e.g., in the cafeteria line a second time), an alert is generated. In some embodiments, the body-worn device includes an identification device (e.g., an RFID or a low-power transmitter such as Bluetooth or other), such that the body-worn device is detectable by detection devices positioned in desired locations within the correctional facility.

In one embodiment, a method of alerting when an inmate traverses a food line of a correctional facility more than a predetermined number of times is disclosed. The method includes locking a body-worn device to the inmate; an RFID being embedded within the body-worn device. An RFID reader is positioned at the food line in the correctional facility. Now, when the inmate is in the food line, reading a value of the RFID by the RFID reader when the RFID is in proximity of the RFID reader, indicative of the inmate obtaining a meal. A record containing the value of the RFID is transmitted to a computer system and when the computer system receives the record containing the value of the RFID, the computer system stores an RFID reader location, the value of the RFID, and a timestamp in a memory of the computer system.

In another embodiment, a method of alerting when an inmate traverses a food line of a correctional facility more than a predetermined number of times is disclosed. The method includes locking a body-worn device to the inmate; a low-power wireless transmitter being embedded within the body-worn device and periodically transmitting an identification value of the body-worn device from the low-power wireless transmitter. A wireless receiver is positioned at the food line of a cafeteria in the correctional facility and the wireless receiver receives the identification value when the body-worn device is in proximity of the wireless receiver. The wireless receiver transmits a record containing the identification value to a computer system and when the computer system receives the record containing the identification value and stores the identification value, a location of the wireless receiver, and a timestamp in a memory of the computer system.

In another embodiment, a method of determining a location of an inmate is disclosed. The method includes locking a body-worn device to the inmate; a low-power wireless transmitter being embedded within the body-worn device. The low-power wireless transmitter periodically transmits an identification value of the body-worn device. After receiving the identification value by a wireless receiver when the body-worn device is in proximity of the wireless receiver, the wireless receiver transmits a record containing the identification value to a computer system, and after receiving the record containing the identification value, the computer system stores the identification value, a wireless receiver location, and a timestamp in a memory of the computer system.

BRIEF DESCRIPTION OF DRAWINGS

The invention can be best understood by those having ordinary skill in the art by reference to the following detailed description when considered in conjunction with the accompanying drawings in which:

FIG. 11 illustrates a second flow chart of a second exemplary body-worn device controller having a positioning system.

DETAILED DESCRIPTION OF THE INVENTION

Figure 1:
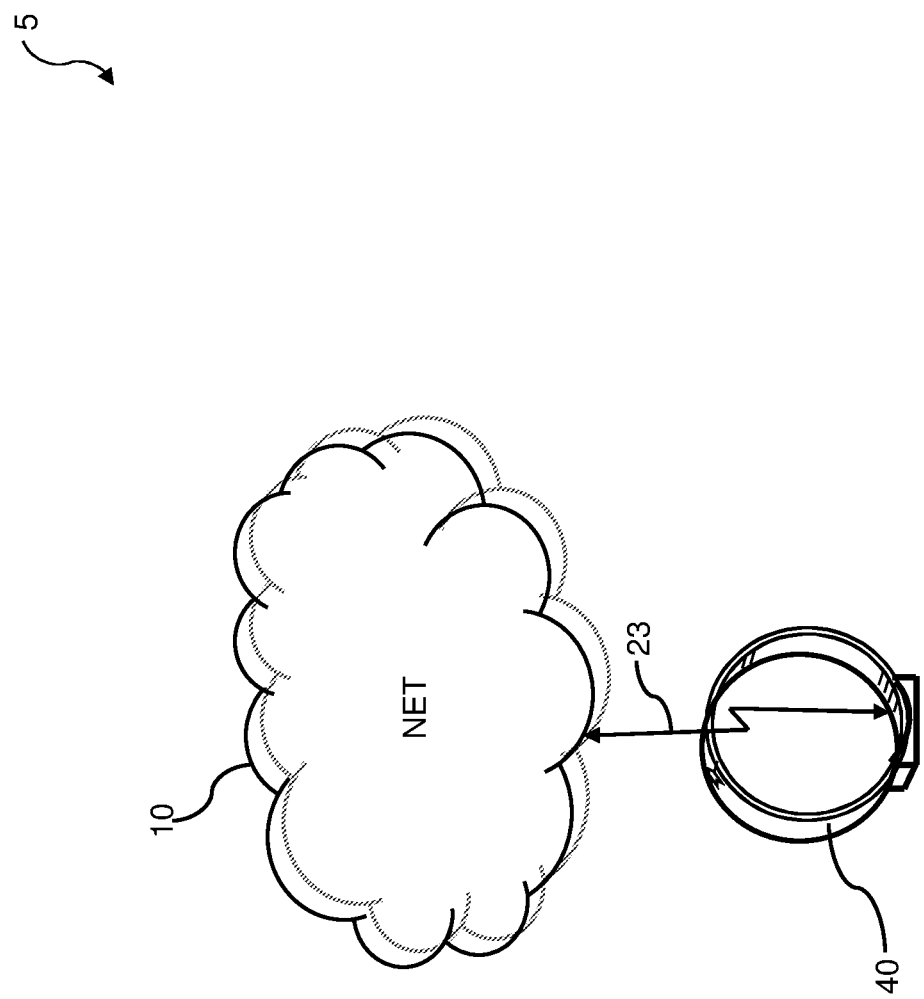
FIG. 1 illustrates a schematic view of a typical wireless communication system and body-worn device.

Reference will now be made in detail to the presently preferred embodiments of the invention, examples of which are illustrated in the accompanying drawings. Throughout the following detailed description, the same reference numerals refer to the same elements in all figures.

The described system pertains to a collection of hardware devices for monitoring the location and environment of any target person. Throughout this description, the target person is typically a detained person such as an inmate in a correctional facility, but there is no restriction to any particular type of target person, nor that the target be a human being, in that the described body-worn device functions the same for any type of movable object. The described system is equally applicable to any other type of scenario. For example, the target person is a teen child, and the body-worn device is worn by the teen child, for example, to monitor cell phone usage while driving.

For simplicity purposes, the following description uses, as an example, the inmate as the target person. In general, depending upon security and policies at a prison, some portion of the population (inmates) is not allowed to be in certain areas or only allowed in certain areas for a single time or limited number of times (e.g., cafeteria line). For example, each inmate is only allowed to go through the cafeteria line once for dinner. Even when the cafeteria line is overseen by a person such as a guard, it is often difficult for the guard to detect a certain inmate re-entering the cafeteria line or, there is potential corruption within the prison staff and guards.

Throughout this description, a body-worn device is used as an embodiment that is easy to understand and is understood in the field of law enforcement and corrections. There is no limitation placed upon the type of device that the disclosed system.

Throughout this description, the term location service refers to either an active location service such as Global Positioning Service (GPS) or a location service that uses triangulation of a radio transmission.

Referring to FIG. 1, a schematic view of a typical wireless communication system 5 is shown, in which a body-worn device 40 is present. The overall structure, communication paths, and connection relationships shown are one example of a wireless communication system 5 and are not meant to limit this disclosure in any way. Many different organizations, protocols, operating frequencies (bands), and architectures are anticipated and all of which are included here within. The body-worn device 40 is intended to operate with any known network 10, including all known and future wireless networks or point-to-point systems. Wireless networks, are for example, the cellular phone network (e.g., GSM, 4G, 5G, CDMA, AMPS), wireless Internet (e.g., WiFi-802.11x), etc. Point-to-point systems include Bluetooth, citizen band radios, walkie-talkie radios, and any other licensed or unlicensed forms of wireless communications. In the system shown in FIG. 1, the body-worn device 40 communicates with other entities through the network 10, though it is fully anticipated that some body-worn devices 40 do not have wireless transceiver capabilities, as will be described.

Within the body-worn device 40 is circuitry 50/50A (see FIGS. 2, 4, 5 and 6) that implements the various features of the body-worn device 40, including some or all of identification transmission, communications with a base station 110, tamper detection, location services (positioning), and powering of the above.

Figure 2:
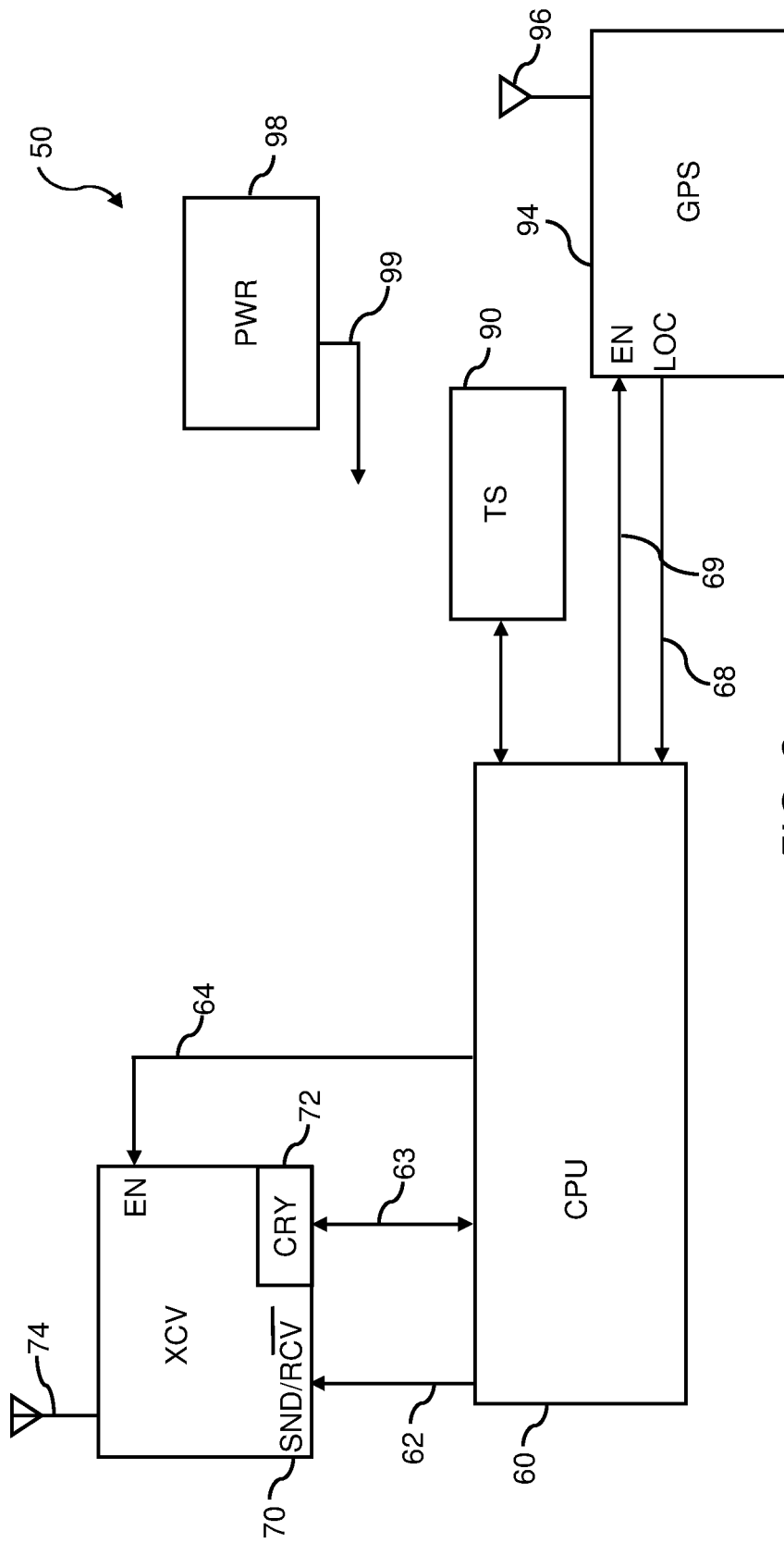
FIG. 2 illustrates a block diagram of a body-worn device.

Referring to FIG. 2, a block diagram of the circuitry 50 of an embodiment of the body-worn device 40 is shown. The circuitry 50 of the body-worn device 40 includes a source of power 98. It is well known how to power such devices ranging from miniature body-worn devices such as watches to more complicated devices that are often specialized worn devices such as house-arrest tracking devices. Any source(s) of power are anticipated, including, but not limited to, batteries, rechargeable batteries, solar cells, radio frequency parasitic extraction, capacitors, super capacitors, fuel cells, etc., including combinations of such. The source of power 98 includes circuitry to condition and regulate the power which is then distributed to the various subsystems by power distribution 99 which are any known conductors as used in the industry, including, but not limited to, wires, printed circuit paths, etc. In some embodiments, the source of power 98 further includes circuitry to control charging as well as a connection or interface to a source of charging power (e.g., a wall-wart, base station, wireless charger, etc.).

In some embodiments, the circuitry 50 of the body-worn device 40 communicates with the land-based system (e.g., base stations 110) through a wireless transceiver 70, preferably having an antenna 74. The wireless transceiver 70 is interfaced to the processor 60 and the processor 60 communicates with and controls the operation of the wireless transceiver 70 by sending commands 62 and data 63 to the wireless transceiver 70 and receiving status and data back in a similar manner. Because such transceivers often consume significant power, in some embodiments, the processor 60 has an enable interface 64 to power down the wireless transceiver 70 when not in use. Any appropriate signaling protocol is anticipated, as transmission collisions with other body-worn devices 40, lost packets, out-of-order packets, noise, etc., must be overcome. The data and signaling is modulated onto a radio frequency using any modulation format such as frequency modulation, amplitude modulation, pulse code modulation, pulse width modulation, etc.

It is anticipated that the wireless transceiver 70 be any type of transceiver, operating over any known frequency or group of frequencies, any known power level(s), and either half-duplex or full duplex. When the wireless transceiver 70 is half-duplex, the processor 60 controls whether the wireless transceiver 70 is receiving or it is transmitting by a mode control 62.

Data is transferred between the processor 60 and the wireless transceiver 70 in any way known in the industry including, but not limited to, shared memory (not shown), serial transfer, parallel transfer, any combination, etc. In some embodiments, though not required, data from the processor 60 is encrypted before transmission. In such, the data is either encrypted by instructions running on the processor 60, or, in some embodiments, by an encryption module 72 within or external to the wireless transceiver 70. Also, in a preferred embodiment, though not required, data from the base station 110 (see FIG. 6) is encrypted before transmission. In such, the encrypted data is received by the wireless transceiver 70, and then the encrypted data is either decrypted by instructions running on the processor 60, or, in some embodiments, by the hardware encryption module 72 within or external to the wireless transceiver 70.

Any band, frequency, wavelength, set of wavelengths, protocols, protocol stacks are anticipated for use by the wireless transceiver 70. There are many protocols and protocol options that provide various transmission capabilities to improve reliability of communications, reduction or elimination of transmission errors, and/or efficiencies in both spectrum usage as well as power consumption. For example, especially in systems that include heartbeat transmissions, it is known to provide each body-worn device 40 with a predetermined back-off period or, instead, a random back-off period is created by the processor 60 such that timing of transmissions is controlled to reduce collisions between multiple body-worn devices 40. In such, for example, if there are 600 body-worn devices 40 and each emits a heartbeat every hour, it is preferred that the heartbeat transmissions are distributed either sequentially or randomly over that hour, such that, for example, during any given minute, 10 of these body-worn devices 40 transmit heartbeats and, preferably, these 10 transmissions are distributed either sequentially or randomly over that minute, to further reduce collisions.

The tamper detection subsystem 90 is also interfaced to the processor 60. The processor 60 controls the operation of the tamper detection subsystem 90 by sending commands and/or signals to the tamper detection subsystem 90 and receiving status and data back in a similar manner (e.g., "intact" or "device removed from body," etc.). It is anticipated that the body-worn device 40 is issued to a particular individual (e.g., inmate) and is locked onto that person by, for example, a leg cuff, arm cuff, neck cuff, belt, etc. Although the body-worn device 40 is secured to the person and not easily removed, it is important that any tampering with the body-worn device 40 be detected (and reported). There are many methods of detecting tampering or removal of a body-worn device 40 known in the industry, all of which are anticipated and included here within. For example, in some embodiments, a conduction path fully encircles the body appendage to which the body-worn device 40 is attached such that, if the enclosure 41 (see FIG. 4) is cut, the circuit opens and the open circuit is detected by the tamper detection subsystem 90. This is a somewhat simple method that is used as an example; in that, a clever person can expose the conductor in two locations, attach an end of a wire to the conductor in each location, then cut through the strap in between the two locations without detection. In some embodiments, more elaborate measurements are used to detect the added resistance (or change in resistance) of the external wire. In some embodiments, an optical light pipe connected at both ends to the body-worn device 40 encircles the appendage and a particular wavelength(s) of light or an encoded light wave signal is emitted into one end of the light pipe. If the signal is detected at the other end, then it is believed that no tampering has occurred, but if the signal is not detected, then tampering is detected and an appropriate alert is transmitted as will be described. There are many types of tamper detection devices anticipated including the above and/or any other type of tamper detection including, but not limited to, motion sensors and accelerometers (e.g., if no movement is detected for a long period of time it is assumed that the body-worn device 40 has been removed from the body).

In some embodiments, the tamper detection subsystem 90 also includes intrusion detection to determine if the enclosure 41 (see FIG. 4) around the electronics has been penetrated. Again, there are many ways to detect such intrusion as known in the industry, all of which are included here within. For example, a simple method includes a micro switch that detects opening of a cover of the enclosure, or the detection of light within the enclosure 41 (see FIG. 4). Normally, there is no light being that the enclosure 41 is made of a non-light transmitting material and completely sealed with no openings, but when the enclosure 41 is compromised, light is allowed to enter the enclosure 41 and triggers the tamper detection subsystem 90. In other embodiments, there is an internal detector that detects one or more materials or physical state normally present in the atmosphere (e.g., change in pressure, humidity, oxygen, nitrogen, etc.) and the enclosure 41 is either evacuated or filled with some other gas (e.g., helium). In this, normally, the detector measures presence or absence of the material, but when the enclosure 41 is cut, atmosphere enters the housing, the gain or loss of the material is detected, and the tamper detection subsystem 90 is triggered.

In some embodiments, a piezoelectric or other sound emitting device 97 is included. In some such embodiments, the sound emitting device 97 emits a sound as an audible alert when an event such as tampering or a targeted RF signal is detected. The audible alert from the sound emitting device is used to augment the wireless delivery of the alert information or as an alternative. For example, if a wireless communication fails, the audible alert is initiated.

Figure 3:
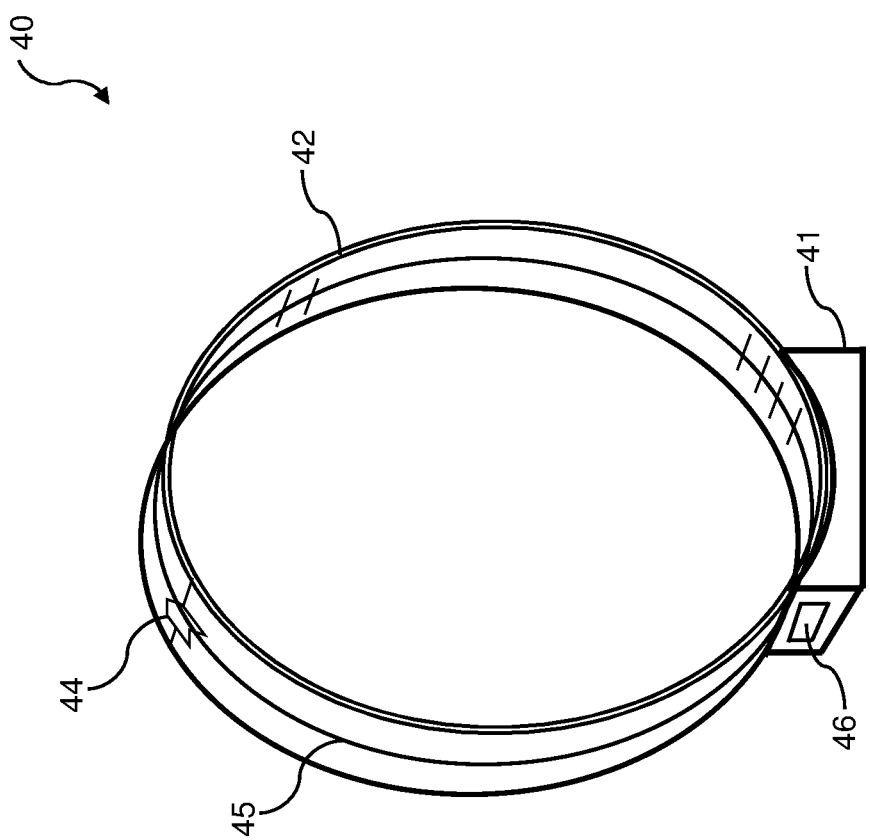
FIG. 3 illustrates a perspective view of an exemplary body-worn device.

Referring to FIG. 3, a perspective view of an exemplary body-worn device 40 is shown. In this example, the body-worn device 40 is a collar, such as a leg collar, arm collar, or neck collar, while in other embodiments; the body-worn device 40 is of slightly different forms for attachment to the body in different ways such as by a belt-like system. In the exemplary body-worn device 40 shown in FIG. 4, some or all of the circuitry 50 are located within an enclosure 41 that is made as part of the strap 42 or affixed to the strap 42 so as to resist removal and/or intrusion. The strap 42 is locked closed after placing around the person's appendage, for example by a tamper-proof lock 44. In some embodiments, the lock 44 is part of the enclosure 41. In some embodiments, the tamper-proof lock includes a one-way closure system in which, the strap 42 is tightened around an appendage by capturing more of the strap 42 through the one-way closure system, then cutting off any excess of the strap 42. In some embodiments, especially those with electronics, conductors, and/or light pipes within the strap 42, the strap 42 is of fixed length and locks into the enclosure 41, completing the tamper detection circuit. In the industry of inmate or release monitoring (e.g., house arrest), it is well known how to attach a body-worn device 40 to a person and to detect tampering and/or removal, all of which are anticipated and included here within.

Although any form of attachment mechanism is anticipated for the body-worn device 40, in some embodiments, the attachment mechanisms and enclosure 41 are designed to prevent removal under normal wear and impact that often occurs during the wearing of such device such as, during exercise, walking, running, etc. Furthermore, in some embodiments, the attachment mechanisms and enclosure 41 are designed to resist penetration by substances that normally contact the wearer such as during showering, rain, etc. Although any suitable material is anticipated, it is preferred that at least the surface of the strap 42 and/or enclosure 41 be made from a hypoallergenic material such as Santoprene, being that the body-worn device 40 will be worn for long periods of time. It is also preferred that the strap 42 be made from materials that will not significantly stretch, even when heated. Stretching is not desired because, in some cases, stretching enables easy removal without detection of tampering. In some embodiments, the enclosure 41 is made of an impact resistant polycarbonate that is rugged, tamper resistant, and seals the electronics from the surrounding environment.

As previously described, in some embodiments, the body-worn device 40 includes a perimeter detection loop 45 that consists of a conductor (either light or electrical signal) that helps detect tampering. For example, if the strap 42 is cut, the perimeter detection loop 45 is broken and a tamper signal is sent from the wireless transceiver 70 of the body-worn device 40 to the base station 110.

In some embodiments, an RFID 46 is mounted in/on the enclosure 41 and/or in the strap 42. This optional RFID 46 (or other readable mechanism such as a bar code, QR code, etc.).

Figure 4:
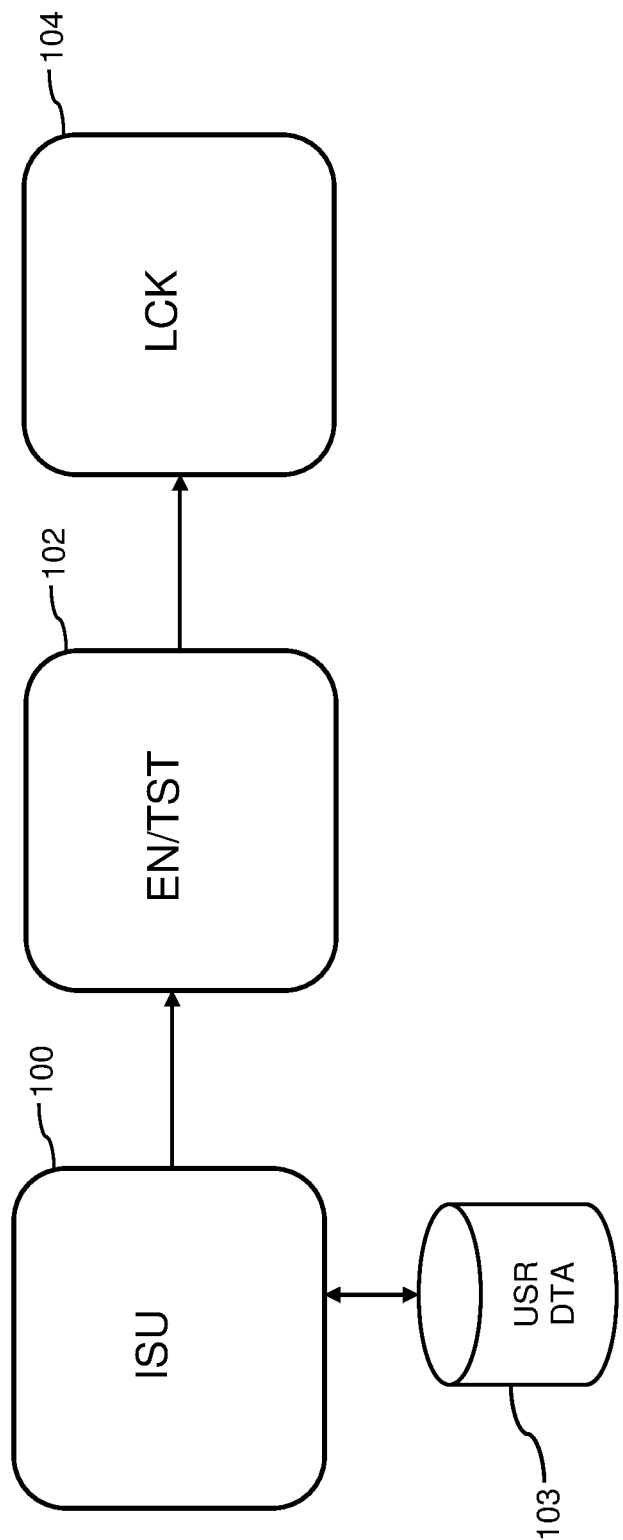
FIG. 4 illustrates a block diagram of communications used to initialize a body-worn device.

Referring to FIG. 4, a block diagram of communications used to initialize a body-worn device 40 is shown. For example, a body-worn device 40 is issued 100 to a user (e.g., an inmate). In some embodiments, user data 103 is captured and/or linked to the body-worn device 40 as each body-worn device 40 is identifiable, for example, by a serial number stored in the non-volatile memory 825 and/or by the RFID 46. In this, either the body-worn device 40 has an embedded serial number that is then linked to the user data 103 or some part of the user data 103 is uploaded and stored in the non-volatile memory 825 (see FIG. 7) of the body-worn device 40 such as the name of the wearer. In this way, either the serial number or that part of the user data 103 is later used as part of the communications between the body-worn device 40 and the base station 110 to identify the wearer (e.g., inmate). Once the user data 103 is captured/linked and the issuance is complete, this body-worn device 40 is enabled and tested 102. For example, communications are established, and test messages sent/received between the wireless transceiver 70 of the body-worn device 40 and the base station 110 to insure proper operation. If the enablement and testing 102 is successful, the body-worn device 40 is then locked 104, for example, locked around the wearer's (e.g., inmate's) appendage (e.g., leg or arm).

In some embodiments, it is anticipated that software updates for the processor within the body-worn device 40 are performed, as necessary, through the wireless interface between the wireless transceiver 70 and the base station 110.

In some embodiments, the condition of the battery in the body-worn device 40 is also reported during some or all transmissions. In some embodiments, diagnostics or self-tests are performed during initialization and/or periodically and any anomalies are reported through the wireless interface between the wireless transceiver 70 and the base station 110.

Figure 5:
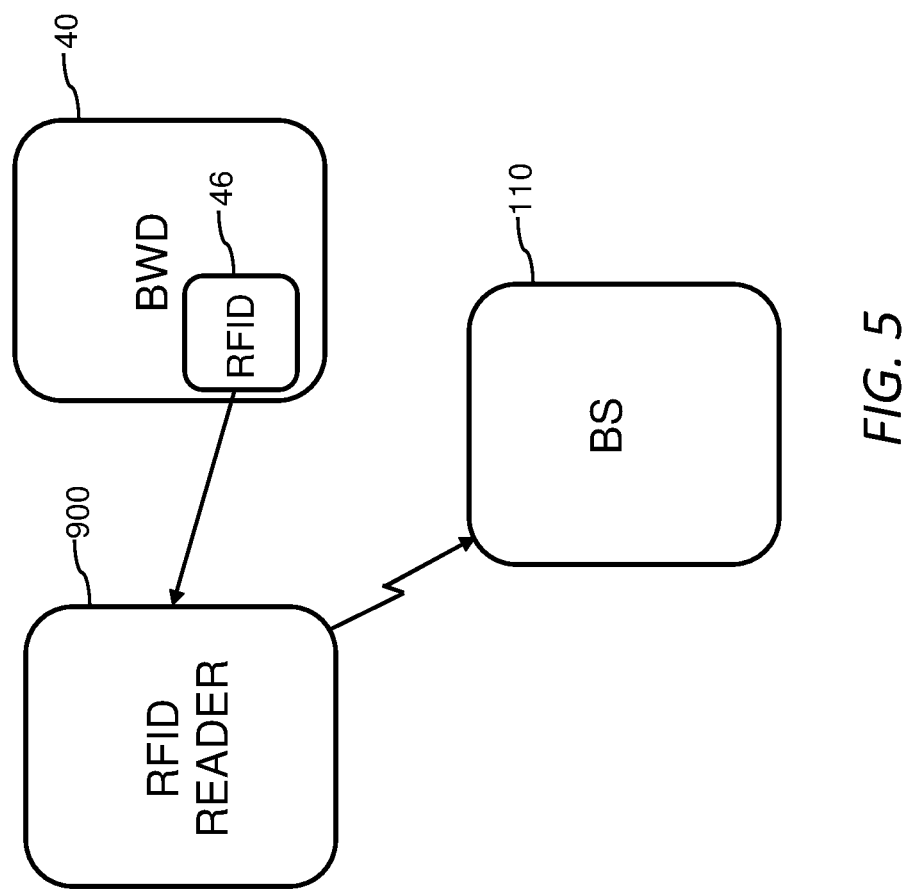
FIG. 5 illustrates a block diagram of a body-worn device with an RFID.

Referring to FIG. 5, a block diagram of a body-worn device 40 is shown being scanned by an RFID reader 900. In such, the RFID reader 900 is strategically placed, for example, in a location where the inmate must pass after obtaining their food in the cafeteria line. The RFID reader 900 reads the value of the RFID 46 and forwards the value of the RFID 46 to the base station 110 (or other computer system). At either the RFID reader 900 or at the base station 110, the value of the RFID 46 is timestamped with the current time. Since the RFID reader 900 may read the same RFID 46 more than once, the base station 110 deletes or ignores multiple receptions of the value of the RFID 46 that are received in a predetermined time window. For example, since it may take an inmate two minutes to get their food in the cafeteria food line, then all readings of the value of the RFID 46 in that 2-minute time window are reduced down to one reading and stored. Now, when the RFID reader 900 receives a new value that matches that value of the RFID 46, for example, after the 2-minute time window, it is assumed that the inmate that is assigned to that body-worn device 40 has reentered the cafeteria line. In some scenarios, this violates the rules of the correctional facility, though some correctional facilities permit two trips through the food line, in which case a counter is used to determine how many trips the inmate made to the food line and a violation occurs when this counter is greater than a predetermined number of allowed times. Note that the RFID reader 900 is connected to the base station 100 in any wired or wireless communications path or network and there are any number of RFID readers 900.

Figure 6:
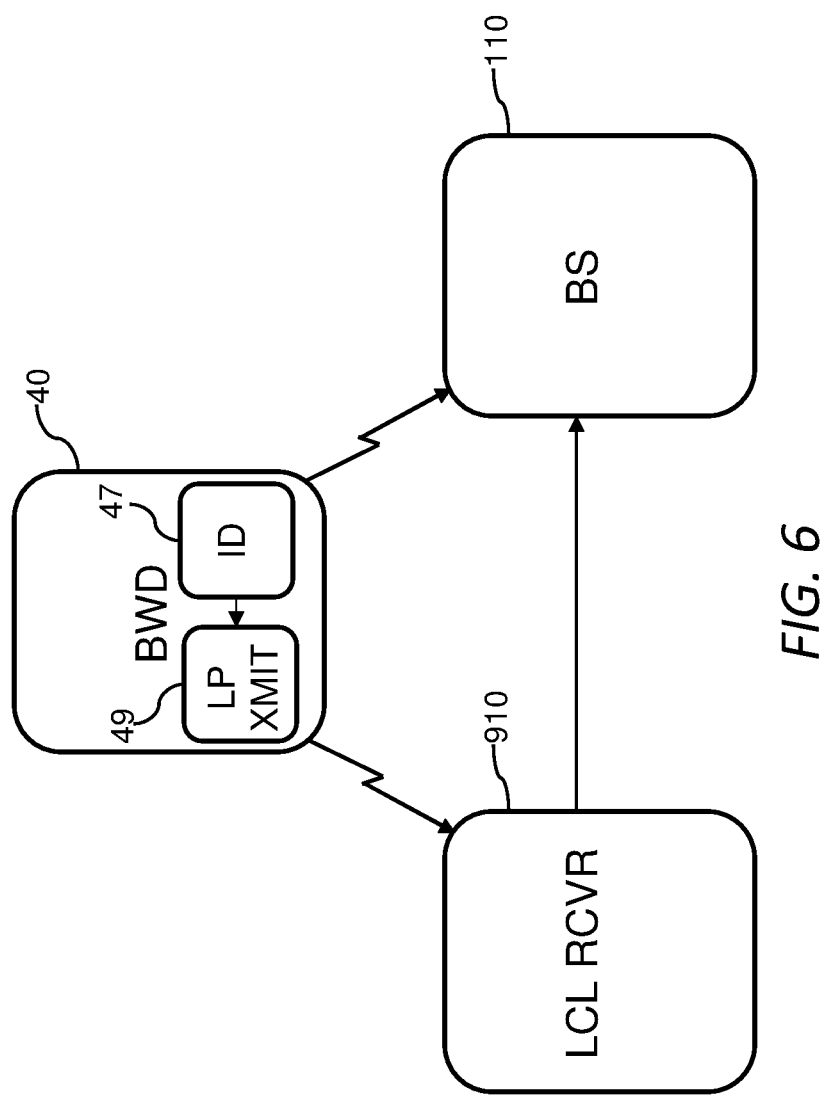
FIG. 6 illustrates a block diagram of a body-worn device with a low-power transmitter.

Referring to FIG. 6, a block diagram of a body-worn device 40 is shown transmitting a low-power signal from a low-power transmitter 49 to a wireless receiver 910. In such, wireless receiver 910 is strategically placed, for example, in a location where the inmate must pass after obtaining their food in the cafeteria line. The body-worn device 40 periodically transmits and identification value 47 using a low-power transmitter 49 (e.g., Bluetooth transmitter, etc.). The wireless receiver 910 receives the transmission from the low-power transmitter 49 and decodes the identification value 47 of the body-worn device 40. The base station then forwards the identification value 47 of the body-worn device 40 to the base station 110 (or other computer system). At either the wireless receiver 910 or at the base station 110, the identification value 47 is timestamped with the current time. Since the local receiver may read the same identification value 47 more than once, the base station 110 deletes or ignores multiple receptions of the identification value 47 that are received in a predetermined time window. For example, since it may take an inmate two minutes to get their food in the cafeteria line, then all readings of the identification value 47 in that 2-minute time window are reduced down to one reading and stored. Now, when the wireless receiver 910 receives a new value that matches that identification value 47, for example, after the 2-minute time window, it is assumed that the inmate that is assigned to that body-worn device 40 has reentered the cafeteria line, in some scenarios violating the rules of the correctional facility. In some scenarios, a fixed number of visits to the food line are permitted, in which case a counter is used to determine how many visits each inmate has made. Note that the wireless receiver 910 is connected to the base station 100 in any wired or wireless communications path or network and there are any number of local receivers 910.

Figure 7:
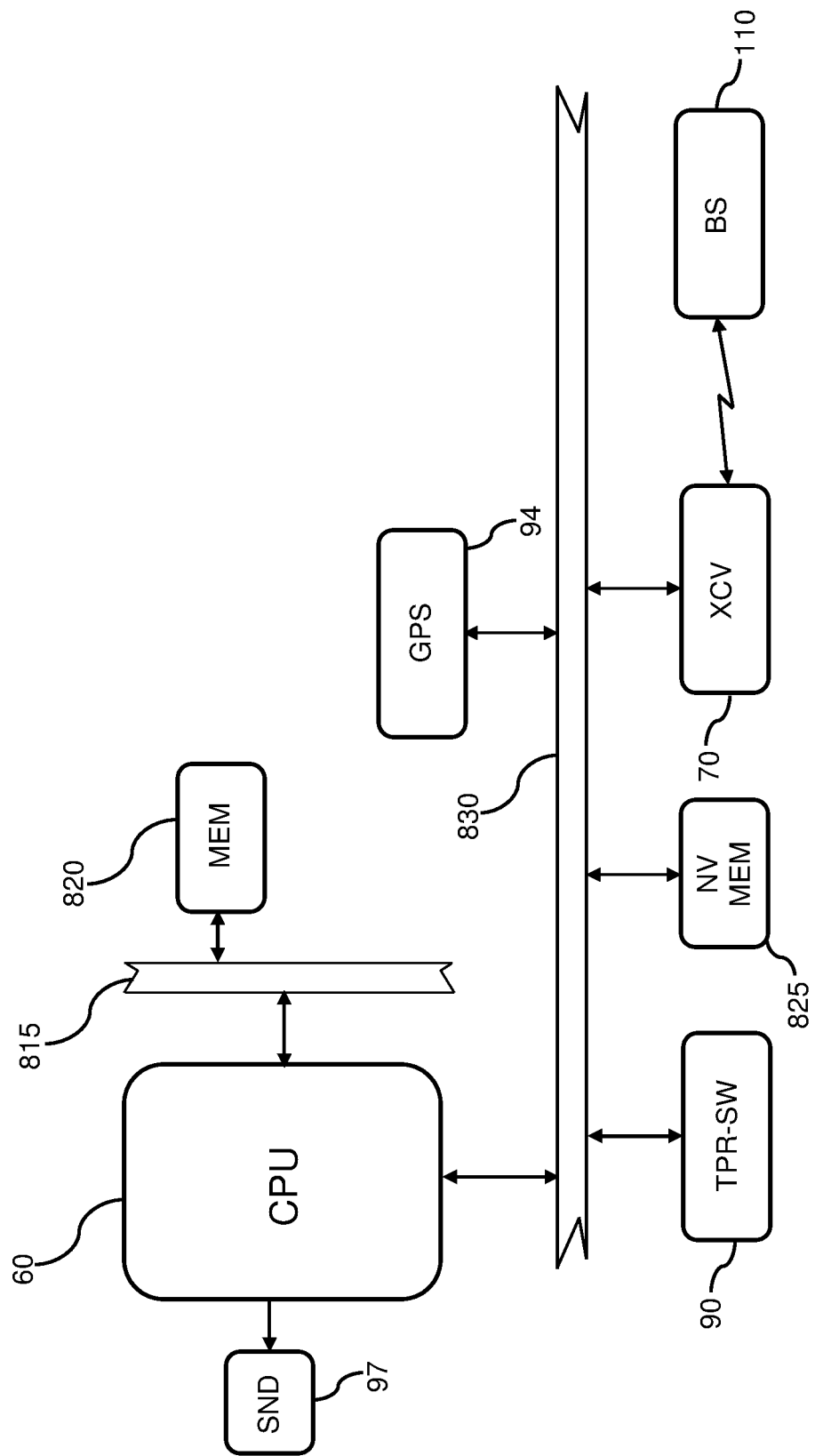
FIG. 7 illustrates a block diagram of a body-worn device with positioning service.

Referring to FIG. 7, a schematic view of an exemplary circuitry 50 of the body-worn device 40 is shown. The example system represents an exemplary processor-based system housed in a body-worn device 40. Although, throughout this description, a processor-based system is described, it is known to implement the same or similar functionality in a system of logic or analog components providing similar functionality in an equivalent system. The source of power 98 (e.g., battery, power management, charge control, etc.) is not shown for clarity reasons.

The exemplary system of the body-worn device 40 is shown in its simplest form, having a single processor 60 (e.g., controller, microcontroller, microprocessor, etc.). Many different computer architectures are known that accomplish similar results in a similar fashion and the present invention is not limited in any way to any particular processing element. In this exemplary circuitry of the body-worn device 40, a processor 60 executes or runs stored programs that are generally stored for execution within a memory 820. The processor 60 is any processor, for example an ARM Coretex single chip processor or the like. The memory 820 is connected to the processor by a memory bus 815 or similar and is any memory 820 suitable for connection with the selected processor 60, such as SRAM, DRAM, SDRAM, RDRAM, DDR, DDR-2, etc. Also connected to the processor 60 is a system bus 830 for connecting to peripheral subsystems, though some processors include internal I/O ports instead of a system bus 830. In general, the non-volatile memory 825 is interfaced to the processor 60 through the system bus 830 and is used to store programs, executable code, and data, persistently. Examples of persistent storage include core memory, FRAM, flash memory, etc.

In embodiments in which Global Positioning is included, a positioning system 94 (e.g., GPS) is interfaced to the processor 60 by the system bus 830. In such, the processor controls the positioning system 94 operation by sending commands to the positioning system 94 over the system bus 830 and receiving status and data back in a similar manner (e.g., latitude and longitude).

The tamper detection subsystem 90 is also interfaced to the processor 60 by, for example, the system bus 830 (or through an input/output port, etc.). In such, the processor controls the operation of the tamper detection subsystem 90 by sending commands to the tamper detection subsystem 90 over the system bus 830 and receiving status and data back in a similar manner (e.g., intact or "device removed from body," etc.).

The circuitry 50 of the body-worn device 40 communicates with the land-based system (e.g., base stations 110 or repeater) through a wireless transceiver 70. The wireless transceiver 70 is also interfaced to the processor 60 by, for example, the system bus 830 (or through an input port, etc.). In such, the processor communicates with and controls the operation of the wireless transceiver 70 by sending commands and data to the wireless transceiver 70 over the system bus 830 and receiving status and data back in a similar manner.

Although a specific architecture is shown connecting the various subsystems 94/80/90/825/70 to the processor 60, any known interface is anticipated including, but not limited to, parallel bus architectures, serial bus architectures, parallel/serial bus architectures, input/output port interfaces, Inter-Integrated Circuit links (I2C—two-wire interface), etc.

In some embodiments, a sound emitting device 97 (not shown) is interfaced to the processor 60, in this example, through an output pin, though any form of connection is anticipated, including an interface to the system bus 830. Any type of sound emitting device 97 is anticipated such as a piezoelectric element, speaker, electromechanical vibrator, indirect sound emitter, etc. In some embodiments, the sound emitting device is driven directly by the processor 60; while in other embodiments, the sound emitting device includes driver circuitry such as an oscillator and/or power amplifier.

In operation, the processor periodically receives location information from the GPS 94 and forwards the location information along with an identification to a repeater or to the base station 110. The base station 110 then timestamps the location information, stores the timestamp, and processes the location, identification, and timestamp to determine if the wearer of the body-worn device 40 is in a location prohibited for that wearer or if the wearer has visited a specific location more than the number of times allowed in a specific period of time (e.g., the wearer was in the cafeteria line twice during the lunch period).

Figure 8:
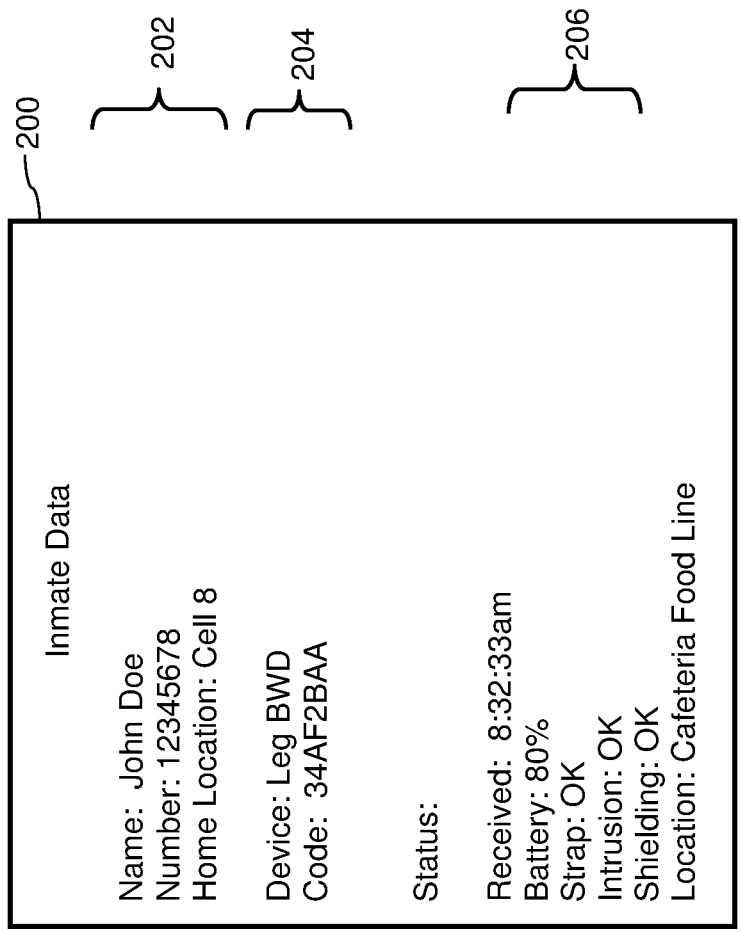
FIG. 8 illustrates an exemplary account record of an account of an inmate.

Referring to FIG. 8, a first data record 200 showing the status of a body-worn device 40 is shown. In this example, the first data record 200 pertains to the person 202 and includes an inmate name (John Doe), an inmate number (12345678), and a home location (Cell 8). Data 204 pertaining to the body-worn device 40 assigned to this inmate includes a description of the device (Leg BWD) and a code (34AF2BAA) which is, for example, a serial number of this body-worn device 40 or a value of an RFID 46 embedded in this body-worn device 40. Next, status 206 of the assigned body-worn device 40 is shown/displayed, including a time (or date and time) when the data was received (e.g., when the data was timestamped), a condition of the battery, tamper status of the body-worn device 40, and a location (e.g., latitude and longitude or named location) of the body-worn device 40. Note that, in some embodiments, more or less information is included.

Figure 9:
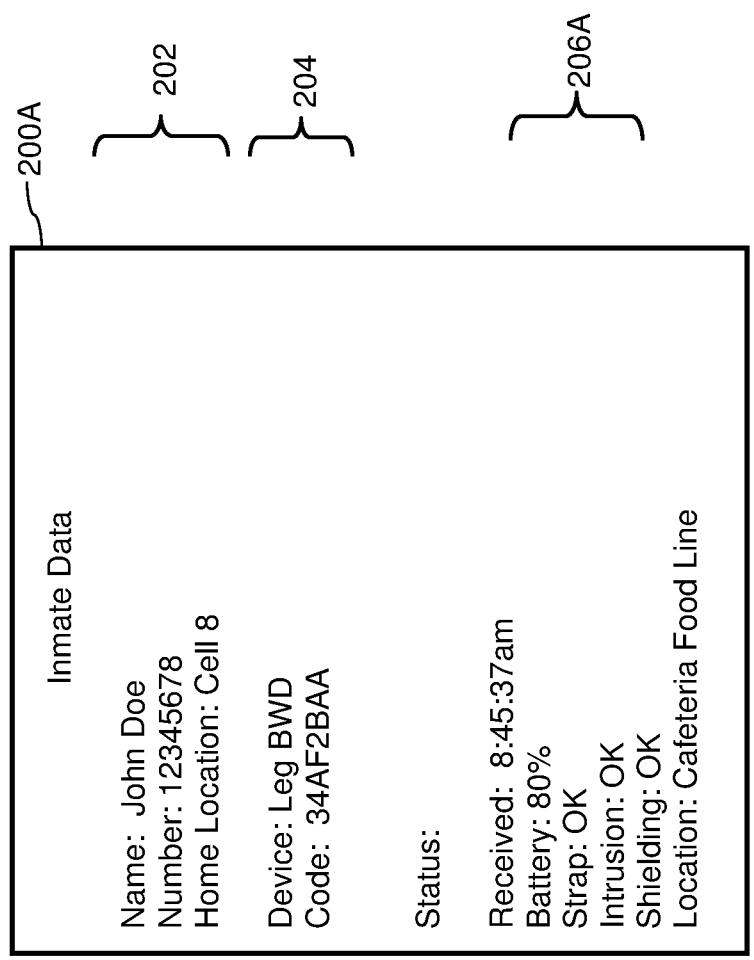
FIG. 9 illustrates an exemplary account record of an account of an inmate at a later time.

Referring to FIG. 9, a second data record 200A showing the status of a body-worn device 40 is shown. In this example, the second data record 200A pertains to the same person/inmate as in FIG. 8; person 202, inmate John Doe, inmate number (12345678), and home location (Cell 8). The data record includes similar Data 204 pertaining to the body-worn device 40 assigned to this inmate includes a description of the device (Leg BWD) and a code (34AF2BAA) which is, for example, a serial number of this body-worn device 40 or a value of an RFID 46 embedded in this body-worn device 40; and similar status 206A, including a time (or date and time) when the data was received (e.g., timestamp), a condition of the battery, tamper status of the body-worn device 40, and a location (e.g., latitude and longitude or named location) of the body-worn device 40.

It should be noted that the first data record 200 and the second data record 200A are almost the same except for the time received. The first data record 200 was received at 8:32:33 am and the second data record 200A was received at 8:45:37 am. Since the location of the body-worn device 40 is the same in both the first data record 200 and the second data record 200A, that being the cafeteria food line, it can be determined that the inmate (John Doe) visited the cafeteria food line twice, approximately 13 minutes apart, and therefore, this inmate might have violated the rules of the correctional facility. Note that it is anticipated that a certain number of data records have been ignored or deleted as the RFID reader 900, wireless receiver 910, or base station 110 often receives several data records while the body-worn device 40 is in proximity to the RFID reader 900, wireless receiver 910, or the body-worn device 40 transmits multiple packets to the base station 110 while the body-worn device is in the same location (e.g., multiple while the inmate is deciding on what meal to take at the cafeteria food line).

Figure 10:
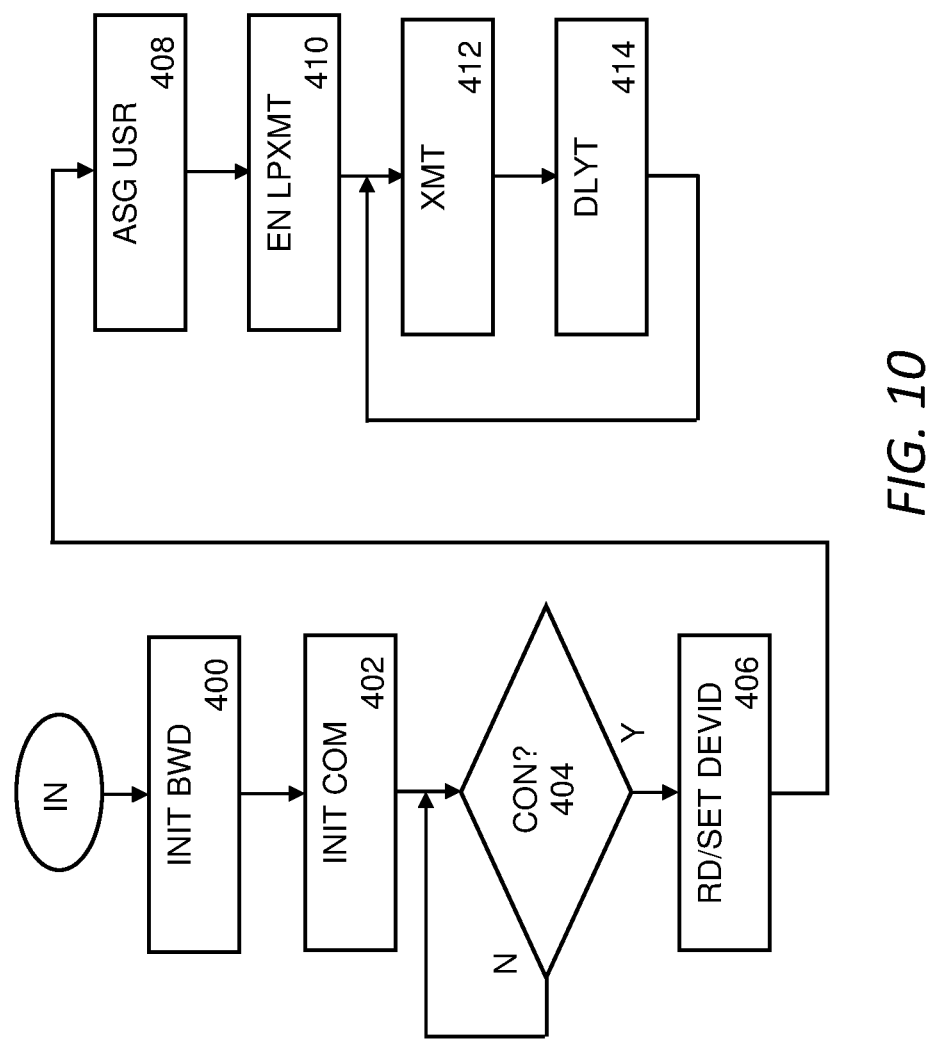
FIG. 10 illustrates a flow chart of an exemplary body-worn device controller having a lower power transmitter.

Referring to FIG. 10, a flow chart of exemplary software of the body-worn device 40 is shown. When power is initially applied to the body-worn device 40, the processor 60 initializes 400 and then initializes communications 402. For example, communications with a base station 110 is initialized 402. The system repeatedly attempts to communicate with the base station 110 until a connection is detected 404, at which time the body-worn device identification is established 406. This is performed by either reading a hard or soft serial number of the body-worn device 40 and transmitting that serial number to the base station 110 or by determining a unique serial number by the base station 110 (or name of inmate) and transmitting that serial number to the body-worn device 40 where the serial number is then stored in non-volatile memory 825. Next, a user (e.g., inmate) is assigned 408 to that serial number so that any future communications containing that serial number will be identifiable with that user (e.g., inmate). Now the lower-power transmitter 49 is enabled 410 and periodically transmits 412 the indentation value 47, the period being determined by the delay 414.

Referring to FIG. 11, a flow chart of a second exemplary processor 60 of the body-worn device 40 is shown. This flow is similar to that shown in FIG. 11, except implementing a heartbeat monitor to determine if the body-worn device 40 has been cloaked. When power is initially applied to the body-worn device 40, the processor 60 initializes 400. Next, communication is initialized 402, in a preferred embodiment with a base station 110. The system repeatedly attempts to communicate with the base station 110 until a connection is detected 404, at which time the body-worn device identification is established 406. This is performed by either reading a hard or soft serial number of the body-worn device 40 and transmitting that serial number to the base station 110 or by determining a unique serial number by the base station 110 and transmitting that serial number to the body-worn device 40 where the serial number is then stored in non-volatile memory 825. Next, a user (e.g., inmate) is assigned 408 to that serial number so that, any future communications containing that serial number will be identifiable with that user (e.g., inmate).

Next the global positioning service (GPS) 94 is enabled 440.

Until reset, the circuitry 50 of the body-worn device 40 continuously loops, each time through the loop reading a location 450 from the global positioning service 94 to determine the location of the body-worn device 40 and transmitting 452 the location and the identification for reception by the base station 110. In this embodiment, the tamper detection circuit is also checked for tampering 454 and if tampering 454 has occurred, an indication of the tampering and the identification is transmitted 460 for reception by the base station 110. Next, a delay 456 is taken to save power and limit the number of sequential transmissions and the loop repeats.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A method of alerting when an inmate traverses a food line of a correctional facility more than a predetermined number of times, the method comprising:
    locking a body-worn device to the inmate, an RFID being embedded within the body-worn device;
    positioning an RFID reader at the food line in the correctional facility;
    reading a value of the RFID by the RFID reader when the RFID is in proximity of the RFID reader, indicative of the inmate obtaining a meal;
    transmitting a record containing the value of the RFID to a computer system;
    the computer system receiving the record containing the value of the RFID and storing an RFID reader location, the value of the RFID, and a timestamp in a memory of the computer system; and
    when the computer system receives each record containing the value of the RFID and the RFID reader location, the computer system searches the memory for prior records containing the value of the RFID and the RFID reader location to determine when the inmate has passed through the food line more than once in a pre-determined time period.

2. The method of claim 1, wherein the timestamp is generated by the RFID reader and added to the record before transmitting the record to the computer system.

3. The method of claim 1, wherein the timestamp is generated by the computer system after receiving the record.

4. The method of claim 1, further comprising transmitting of an alert message to a staff person at the correctional facility when the inmate has passed through the food line more than once in the pre-determined time period.

5. The method of claim 1, further comprising counting a number of times that the inmate has passed through the food line in a pre-determined time period and transmitting an alert message to a staff person at the correctional facility when the inmate has passed through the food line more than a pre-determined number of allowed times in the pre-determined time period.

6. The method of claim 1, further comprising the computer system determining the RFID reader location from knowledge of the RFID reader location stored within the computer system.

7. A method of alerting when an inmate traverses a food line of a correctional facility more than a predetermined number of times, the method comprising:
    locking a body-worn device to the inmate, a low-power wireless transmitter being embedded within the body-worn device;
    periodically transmitting an identification value of the body-worn device from the low-power wireless transmitter;
    positioning a wireless receiver at the food line of a cafeteria in the correctional facility;
    receiving the identification value by the wireless receiver when the body-worn device is in proximity of the wireless receiver;
    transmitting a record containing the identification value to a computer system;
    the computer system receiving the record containing the identification value and storing the identification value, a location of the wireless receiver, and a timestamp in a memory of the computer system; and
    when the computer system receives each record containing the identification value and the location of the wireless receiver, the computer system searches the memory for prior records containing the identification value and the location of the wireless receiver to determine whether the inmate has p assed through the food line more than once in a pre-determined time period.

8. The method of claim 7, wherein the timestamp is generated by the wireless receiver and added to the record before transmitting the record to the computer system.

9. The method of claim 7, wherein the timestamp is generated by the computer system after receiving the record.

10. The method of claim 7, further comprising transmission of an alert message to a staff person at the correctional facility when the inmate has passed through the food line more than once in the pre-determined time period.

11. The method of claim 7, further comprising counting a number of times that the inmate has passed through the food line in a pre-determined time period and transmitting an alert message to a staff person at the correctional facility when the inmate has passed through the food line more than a pre-determined number of allowed times in the pre-determined time period.

12. The method of claim 7, further comprising the computer system determining the location of the wireless receiver from knowledge of the location of the wireless receiver stored within the computer system.

13. The method of claim 7, wherein the low-power wireless transmitter is a Bluetooth transmitter.

14. The method of claim 7, wherein the low-power wireless transmitter is a Bluetooth transceiver.

15. A method of determining a location of an inmate, the method comprising:
    locking a body-worn device to the inmate, a low-power wireless transmitter being embedded within the body-worn device;

periodically transmitting an identification value of the body-worn device from the low-power wireless transmitter;

receiving the identification value by a wireless receiver when the body-worn device is in proximity of the wireless receiver;

transmitting a record containing the identification value;

a computer system receiving the record containing the identification value and storing the identification value, a wireless receiver location, and a timestamp in a memory of the computer system; and positioning the wireless receiver in a food line of a cafeteria of a correctional facility and when the computer system receives each record containing the identification value and the wireless receiver location, the computer system searches the memory for prior records containing the identification value and the wireless receiver location to determine when the inmate has passed through the food line more than once in a pre-determined time period.

16. The method of claim 15, further comprising transmission of an alert message to a staff person at the correctional facility when the inmate has passed through the food line more than once in the pre-determined time period.

17. The method of claim 15, further comprising counting a number of times that the inmate has passed through the food line in the pre-determined time period and transmitting an alert message to a staff person at the correctional facility when the inmate has passed through the food line more than a predetermined number of allowed times in the pre-determined time period.

* * * * *